(12) United States Patent
Gotsman et al.

(10) Patent No.: US 7,925,730 B1
(45) Date of Patent: Apr. 12, 2011

(54) LOCALIZATION FOR SENSOR NETWORKS

(75) Inventors: Craig Gotsman, Haifa (IL); Yehuda Koren, Elizabeth, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 894 days.

(21) Appl. No.: 11/321,053

(22) Filed: Dec. 30, 2005

(51) Int. Cl.
*G06F 15/173* (2006.01)
(52) U.S. Cl. .................. 709/223; 709/238; 709/239
(58) Field of Classification Search ............ 709/206, 709/224, 226, 238, 239; 370/351
See application file for complete search history.

(56) References Cited

U.S. PATENT DOCUMENTS

| | | | | |
|---|---|---|---|---|
| 2004/0257994 A1* | 12/2004 | Paskett et al. | ............. | 370/230 |
| 2005/0055417 A1* | 3/2005 | Reich et al. | ............. | 709/208 |
| 2005/0080924 A1* | 4/2005 | Shang et al. | ............. | 709/239 |
| 2005/0288888 A1* | 12/2005 | Ye et al. | ............. | 702/150 |
| 2006/0095518 A1* | 5/2006 | Davis et al. | ............. | 709/206 |
| 2006/0155818 A1* | 7/2006 | Odenwald et al. | ............. | 709/208 |
| 2006/0256768 A1* | 11/2006 | Chan | ............. | 370/351 |
| 2007/0150176 A1* | 6/2007 | Zhang et al. | ............. | 701/201 |

FOREIGN PATENT DOCUMENTS

EP  1786143 A2 * 5/2007

OTHER PUBLICATIONS

DV Based Positioning in Ad Hoc Networks; Telecommunication Systems; Publisher-Springer Netherlands; ISSN1018-4864 (Print) 1572-9451 (Online)Issue vol. 22, Nos. 1-4 / Jan. 2003; pp. 267-280.*
C. Gotsman and Y. Koren, Distributed Graph Layout for Sensor Networks, Proc. Intl. Symp. Graph Drawing, LNCS 3383, Springer Verlag. pp. 273-284, dated 2004.
D. Moore, et al., Robust Distributed Network Localization With Noisy Range Measurements, Proc. ACM Conf. on Embedded Networked Sensor Systems (SenSys), dated 2004.
Y. Shang et al., Improved MDS-Based Localization, Proc. IEEE Infocom, dated 2004.

* cited by examiner

*Primary Examiner* — Nathan Flynn
*Assistant Examiner* — Najeeb Ansari
(74) *Attorney, Agent, or Firm* — Hope Baldauff Hartman, LLC (57) ABSTRACT

A method and system for sensor network localization including communicating with a plurality of directly neighboring sensor nodes to determine a patch in a sensor network, localizing the patch, generating a system of equations from computed local coordinates of the patch, incorporating global coordinates of a plurality of sensor nodes into the system of equations, and solving the equations using a distributed equation solver is described. The described methods and systems have utility in the arts of military, radio, police, fire, rescue, business, travel, and other diverse applications.

11 Claims, 4 Drawing Sheets

LOCALIZATION FOR SENSOR NETWORKS

FIELD OF THE INVENTION

The invention relates generally to sensor networks. More specifically, the invention provides a method for sensor network localization.

BACKGROUND OF THE INVENTION

Sensor networks are a collection of devices, each with limited computing and communication capabilities, distributed over a physical area. A network collects data from its environment and typically should be able to integrate it and answer queries related to this data. Sensor networks are becoming more attractive in environmental, military and ecological applications.

The advent of sensor networks has presented a number of research challenges to the networking and distributed computation communities. Since each sensor can typically communicate only with a small number of other sensors, information generated at one sensor can reach another sensor only by routing it thru the network, whose connectivity is described by a graph. This requires ad-hoc routing algorithms, especially if the sensors are dynamic. Traditional routing algorithms rely only on the connectivity graph of the network, but with the introduction of so-called location-aware sensors, namely, those that also know what their physical location is, e.g. by being equipped with a GPS receiver, this information can be used to perform more efficient geographic routing.

In addition to routing, localization is utilized in the sensor network application itself. For most applications sensed data without spatial and temporal coordinates is of very limited use. Sensor nodes need to be aware of their location to be able to specify where a certain event has occurred. For military, police, or other radio networks, knowing the precise location of each person with a radio can be critical. In warehouses, object location and tracking applications are possible with large-scale ad-hoc networks of wireless tags. Environment monitoring, vehicle tracking and mapping are just a few other application domains where knowledge of sensor location is important. Location awareness is achieved primarily by equipping the sensors with GPS receivers. These, however, may be too expensive, too large, or too power-intense for the desired application. In indoor environments, GPS does not work at all due to the lack of line-of-sight to the satellites, so alternative solutions must be employed. Luckily, sensors are usually capable of other, more primitive, geometric measurements, which may aid in this process. An example of such a geometric measurement is the distance to neighboring sensors. This is typically achieved either by Received Signal Strength Indicator (RSSI) or Time of Arrival (ToA) techniques.

As mentioned, sensor networks are known. However, no method and system for a distributed protocol by which each sensor in a sensor network could use this local information to compute its location in some global coordinate system currently exists. As such, a localization system and method is needed for efficient localization for sensor networks. A method for utilizing location information in any of a number of sensors that is effective in the presence of noisy measurements is also desired.

BRIEF SUMMARY OF THE INVENTION

To overcome limitations in the prior art described above, and to overcome other limitations that will be apparent upon reading and understanding the present specification, the present invention is directed to a method for sensor network localization.

A first aspect of the invention provides a method for sensor network localization including the steps of communicating with a plurality of directly neighboring sensor nodes to determine a patch in a sensor network, localizing the patch, generating a system of equations from computed local coordinates of the patch, incorporating global coordinates of a plurality of sensor nodes into the system of equations, and solving the equations using a distributed equation solver.

A second aspect of the invention provides a system for localizing a sensor network with a plurality of sensor nodes communicably linked in a sensor network, each of the sensor nodes being configured to communicate with a plurality of directly neighboring sensor nodes to determine a patch in the sensor network, localize the patch, generate a system of equations from computed local coordinates of the patch, incorporate global coordinates of a plurality of sensor nodes into the system of equations, and solve the equations using a distributed equation solver.

A third aspect of the invention is a computer readable medium containing instructions stored thereon for execution by a computer. The instructions stored on the computer readable medium include the steps of communicating with a plurality of directly neighboring sensor nodes to determine a patch in a sensor network, localizing the patch, generating a system of equations from computed local coordinates of the patch, incorporating global coordinates of a plurality of sensor nodes into the system of equations, and solving the equations using a distributed equation solver. Additionally, the instructions may also include the step of performing a global stress minimization

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Localization is a core technique for sensor networks, which is typically utilized for the basic operation of the network. Localization facilitates location-stamped information and more advanced capabilities like location-based routing. Hence, many algorithms have been recently proposed to address the localization problem. Many criteria can be used to classify these methods.

Among those classifications well known in the art is the use of two dichotomies of classification: anchor-based vs. anchor-free algorithms and incremental vs. concurrent algorithms. It may be noted that the described system and methods is not constrained by these dichotomies, as the system and methods possess many of the desirable characteristics from each and lacks many of the common negative characteristics. For example, the described systems and methods are capable of incorporating information about locations of designated sensors as in an anchor based method to produce improved, efficient and optimized results. However, these systems and methods do not require many such anchors, and, in fact, can operate well even without explicitly given anchors, thereby becoming an anchor-free method. Likewise, the bottom-up methodology employed by many incremental approaches, by performing local coordinate computations, is utilized in the described methods and systems. This allows local patterns present in the network to be treated accurately, without masking them by assumptions on the global nature of the network. Consequently, regions having a wide variety of geometric shapes may also be handled by the described systems and methods. However, all the pieces of local information may be merged together by a concurrent global optimization process, this global optimization process not being sensitive to local noise as a greedy incremental process typically would be.

As mentioned, new methods and systems for sensor network localization based on short intersensor distances and fully decentralized computation are described. Various embodiments of these new methods and systems include an algorithm that computes local coordinates of small "patches" of sensors and glues them together using a distributed global optimization process. Due to global optimization, the described methods are more robust, resilient and efficient in the presence of noisy measurements than existing incremental methods. Unlike some other global optimization techniques, the described methods are not fooled by local minima that might lead to foldovers in the network layout. The methods are considered anchor-free, thus advance knowledge about locations of some sensors is not required. Nonetheless, the described methods include a manner in which to utilize known locations of any number of anchors. Further, to assist in explanation and understanding of the described system and methods, an experimental study is described herein that shows the effectiveness of the new methods and systems utilizing certain algorithms in noisy environments where the sensors are distributed over regions with a variety of geometric shapes.

Additionally, sensor localization is an increasingly important aspect of sensor networks. Current sensor networks are unable to determine the coordinates of every sensor via local sensor-to-sensor communication. The described methods and systems include methods for determining the coordinates of every sensor ("the layout of the sensor network") via local sensor-to-sensor communication, for example, when given a set of n sensors distributed in a plane and a mechanism by which a sensor can estimate its distance to a few nearby sensors.

For example, in a sensor network it is desirable, for numerous well known reasons, to know the coordinates of all the sensor nodes, which can be referred to as the layout of the sensor network. A sensor network problem may be: given the a set of n sensor distributed in the plane, and a mechanism by which a sensor can estimate its distance to a few nearby sensors, determine the coordinates of every sensor via a local sensor-to-sensor network.

The aforementioned localization problem has a unique solution when the system is rigid, in the sense that the location of any individual sensor cannot be changed without changing at least one of the known distances. When all $n(n-1)/2$ inter-sensor distances are known, the solution is indeed unique (up to a rigid transformation), and is traditionally found efficiently using the classical multidimensional scaling (MDS) technique, as is known in the art. When only a subset of the distances is known, more sophisticated techniques must be used. In this case, even when the solution is unique, its recovery is computationally difficult as the problem becomes NP-hard. As long as the computation is based only on inter-sensor distances, the result will have translation, orientation and reflection degrees of freedom, these are either not important, or can be resolved by assigning some known coordinates to a small number of anchor sensors.

In real-world sensor networks, noise is inevitable. This described noise manifests in the inter-sensor distance measurements being inaccurate. Beyond the complication of the distances possibly no longer being symmetric, thus violating the very essence of the term "distance," there may no longer even exist a solution realizing the measured edge lengths. In this scenario, the best that can be hoped for is a network layout whose coordinates are, up to some acceptable tolerance, close to the true coordinates of the sensors.

In order to be easily and reliably implemented on a sensor network, a solution to sensor localization problem should be fully distributed (decentralized). Thus, each sensor should be computed based on information available only at that sensor and its immediate neighbors. A class of neighbors is typically characterized by the disk graph model as is well known in the art. For example, any sensor within distance R is reachable. Of course, information from one sensor may eventually propagate thru the network to any other sensor in a number of hops, but this should not be done explicitly.

Many of the terms used herein are well known in networks including sensor networks and numerous other areas. For ease of understanding and clarity several specific terms used in illustrating the described method and system are further described below. For example, "patch" as used herein, denotes information regarding the identity of a designated sensor, the identities of other neighboring sensor nodes, the distance between the designated sensor and each neighboring sensor node, and the known pairwise distance among the neighboring nodes. "Neighbors" are two sensor nodes that we know their pairwise distance. Also, "localization" is used to refer to assigning Euclidean coordinates to the sensors. "Non-estimated" when used herein means accurate to a certain amount of reliability. For example, a coordinate determined by GPS would be considered "non-estimated." Reference also may be made to a clique of sensors, which may be used to refer to a set of pairwise sensors for which all pairwise distances are known.

Patchwork Method

Among other things, the described method in an exemplary embodiment localizes small subsets of the sensor network, forming "patches", and then "stitches" them together, hence the method and system described herein will hereafter be referred to by the name PATCHWORK for clarity and reference. The described patches are formed in parallel by subsets of the sensors, with some overlap between neighboring patches. While known methods stitch the patches together incrementally, the described PATCHWORK method stitches them together by solving a global optimization problem in a distributed manner. As described later, this is utilized to avoid entirely any error accumulation, and, moreover, this significantly reduces the localization error which the noise might otherwise introduce. The first stage in the described method is quite powerful in itself, able to recover the layout accurately.

It can also incorporate directly the coordinates of anchor sensors when these exist. Further detailed discussion for clarity and understanding occurs below beginning with a description of the so-called stress function, which plays an important role in localization methods.

Figure 1:
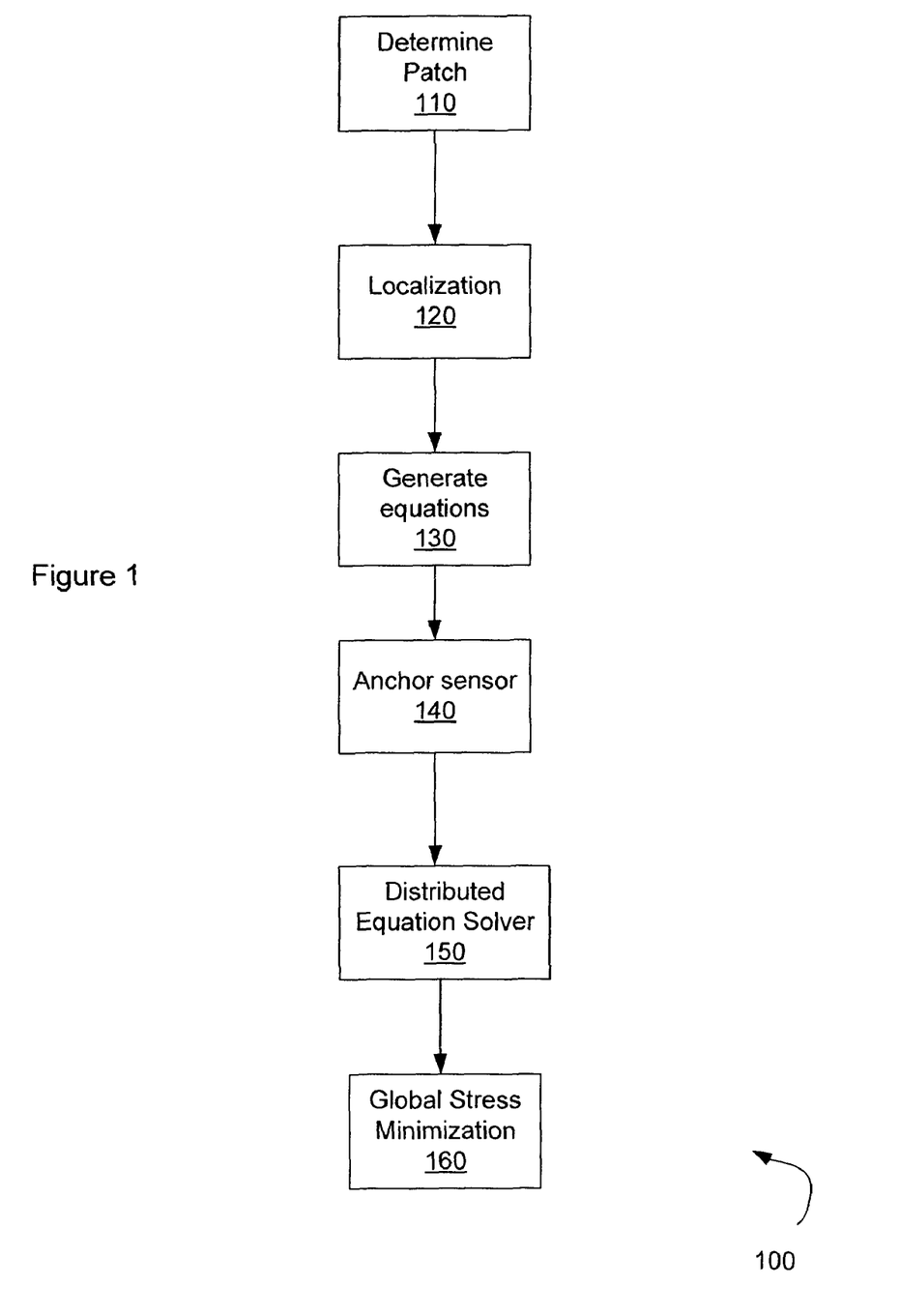
FIG. 1 illustrates a block diagram of an exemplary embodiment of the described method.

FIG. 1 illustrates a block diagram in an exemplary embodiment of the described method. In this embodiment of method 100, a sensor node first determines its patch step 110. Each sensor in the network communicates with its neighbors to learn its patch. The patch notion may denote for example information regarding the identity of the neighboring sensors, the distances between the sensor and each neighbor, the pairwise distance among the neighbors, etc.

Figure 2:
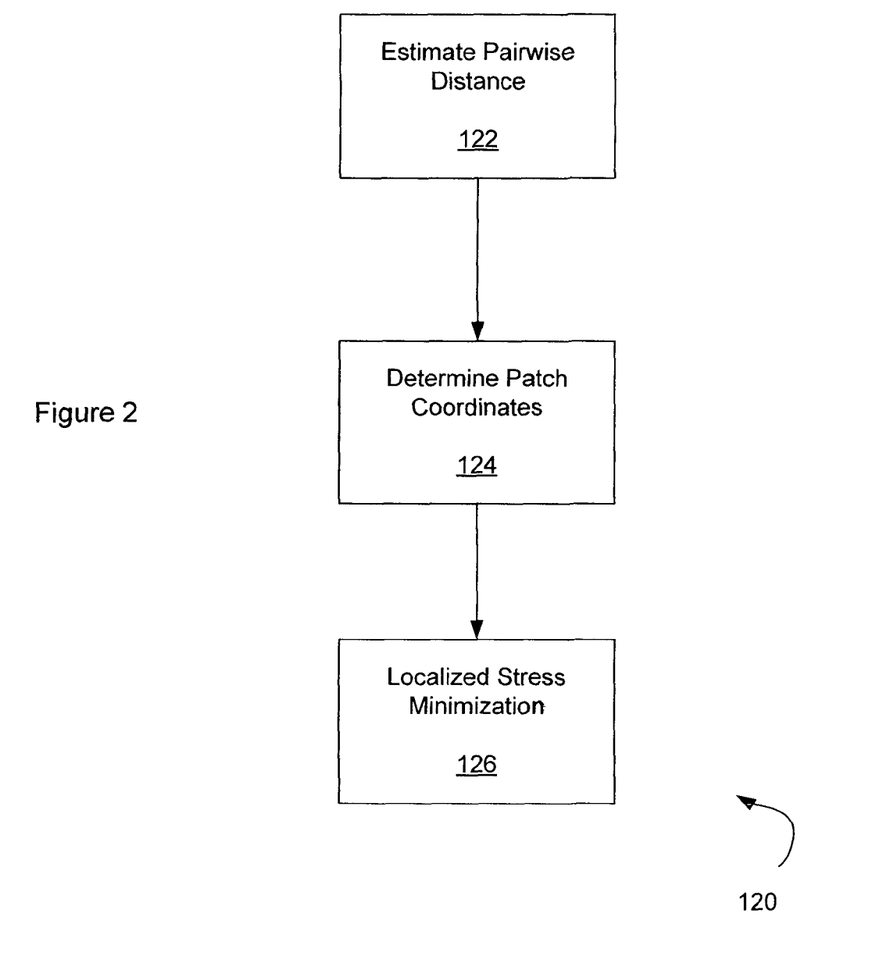
FIG. 2 illustrates a block diagram of another exemplary embodiment of the described method.

Next, localization is performed at step 120. For example, each sensor node assigns local coordinates to its patch. An exemplary technique for performing the described assignment is described in FIG. 2. In the exemplary method of FIG. 2, since some distances between sensors are likely unknown, the pairwise distances are estimated in step 122 using a simple known method. Next, the classical MDS method, as described in detail later, is utilized to determine the patch coordinates in step 124. Finally, the accuracy of the coordinates is improved or optimized by employing a localized stress minimization in step 126. The localized stress minimization in this embodiment is performed with only accurate or non-estimated pair-wise distances. Steps 122, 124, and 126 are described in more detail later.

After localization 120 in the exemplary method 100, a system of equations is generated in step 130. Each sensor may use the computed local coordinates of its patch for deriving a system of equations. The system of equation may be linear equations. Further, these equations may express the sensor node's coordinates in the global layout as an affine combination (i.e. a linear combination with weights having unit sum) of the coordinates of its neighbors.

Next, in step 140, the global coordinates of a set of sensor nodes are incorporated into the system of equations. Typically this is a relatively small set of sensor nodes. This set of sensor nodes may for ease of reference be referred to as anchors. The global coordinates of a set of sensor nodes may be inferred in a number of ways. One exemplary manner is to utilize a GPS system in the sensor network. Various sensor nodes may possess GPS receivers for which global coordinates may be obtained in manners well known. A second exemplary manner in which global coordinates may be obtained is to localize the largest clique using classical MDS. The sensors in the clique will thus be fixed as anchors.

In step 150, the global coordinates are now obtained for all the sensor nodes by solving the resulting system of equations. For example, in a detailed example described later, a distributed equation solver is used to solve a resultant system of linear equations.

Now, in step 160, the exemplary global localization process depicted in FIG. 1 may be completed by performing a global stress minimization on the full sensor network. Step 160 may be particularly beneficial for minimizing the sensitivity of the described method to among other things, measurement noise. As may be suspected, the method shown in FIG. 1 is exemplary and for illustrative purposes. Accordingly certain steps may be modified, varied or eliminated.

The Stress function: Assuming the sensor network is modeled by a graph $G(V=\{1, \ldots, n\}, E)$, such that for every edge $\langle i,j \rangle \in E$ we know the (noisy) distance $l_{ij}$ between sensors i and j. Also assume, without loss of generality, that the distances are always symmetric, so $l_{ij}=l_{ji}$. This can be achieved by requiring neighboring sensors to reach an agreement about their distance (e.g. by averaging $l_{ij}$ and $l_{ji}$). It is desirable to generate a d-dimensional layout $p_1, \ldots, p_n \in R^d$ that realizes all known distances. This layout can be formally characterized as the minimum of the stress function:

$$\text{Stress}(p_1, \ldots, p_n) = \sum_{\langle i,j \rangle \in E} (\|p_i - p_j\| - l_{ij})^2$$

The stress function and its variants are widely used in multidimensional scaling for recovering the geometry of points from their complete set of pairwise distances. This is a non-convex function, hence, in general, its global minimum cannot be found efficiently. In the described scenario, only distances between nearby sensors are known. Because of this partial information, the main phenomenon observed in the (suboptimal) solutions is that of foldovers, where entire pieces of the network fold over on top of others, while still realizing well the known distances.

To overcome the tendency of stress minimization to generate folded layouts, it must be augmented by either initializing the process with some adequate, fold-free, layout $p_1, \ldots, p_n$, or introducing some estimates of long-range distances between distant sensors. These will impose the correct global shape on the layout.

Some of the previously mentioned shortcomings of the well known methods used in sensor network are not as valid when working with a small patch rather than using stress minimization for computing the complete layout of all the sensors in an exemplary network.

Localizing a patch: Consider the neighborhood of a sensor s denoted by $N(s)=\{i | \langle i,s \rangle \in E\} \cup \{s\}$. The distances between s and the sensors in $N(s)$ are known, and typically some of the distances between the sensors within $N(s)$ as well. It is desirable to localize the sensors in $N(s)$ in a common coordinate system, which will approximately realize the given edge lengths in that neighborhood. These sensors will form a patch in the quilt that is being sewed together.

Localizing a patch may be preferable to localizing a complete network on at least two counts. First, when localizing a patch, constraints to a distributed computation that imposes severe restrictions on inter-sensor communications are not present. Instead, all sensors in $N(s)$ may report to s all their inter-distances, and the computation is then done centrally by s. Second, while in the complete network the known distances are considered local and short-range, for a patch the given distances are not local at all (every two sensors are reachable by at most two hops) and a relatively dense set of pairwise distances is present. As observed in the previous section, having such "long-range" distances makes stress minimization more tractable.

An exemplary three-stage method is proposed for localizing a patch. First, estimate the missing distances within the patch. Second, compute the coordinates using classical MDS, which is based on the complete set of pairwise distances. Finally, refine the result using stress minimization based only on the original (more reliable) distances. It is again emphasized that all computations in this particular exemplary embodiment are carried out entirely by the sensor s. Below, the above mentioned stages are now elaborated on in more detail and through specific exemplary embodiments.

I—Estimating missing distances. In this stage estimate $l_{ij}$ for every $\langle i,j \rangle \notin E$.

From the triangle inequality obtain the upper bound $\hat{l}_{ij}$:

$$\hat{l}_{ij} = \min_{k: \langle i,k \rangle \in E, \langle j,k \rangle \in E} \{l_{ik} + l_{jk}\}$$

Moreover, if the graph is a disk graph, the following lower bound exists:

$$\hat{l}_{ij} = \max\{\max_k\{l_{ik}\}, \max_k\{l_{jk}\}\}$$

So an estimate for $l_{ij}$ would be $(\hat{l}_{ij} + \hat{l}_{ij})/2$.

II—Classical MDS. After defining all pairwise distances, obtain coordinates using the classical MDS method. This method computes the coordinates by factoring the inner-product matrix, which can be derived from the pairwise distances as is well known. An advantage of working with classical MDS is its ability to generate the optimal solution regardless of the way it is initialized.

III—Stress minimization. Now refine the layout by using only the known original distances, where stress minimization becomes handy. Minimizing the stress energy using a "localized" version of the majorization technique is well known in the art. In essence, iteratively apply the following update rule, for each i∈N(s):

$$p_i \leftarrow \frac{1}{|\{j \in N(s) \mid \langle i, j\rangle \in E\}|} \sum_{j \in N(s), \langle i,j\rangle \in E} [p_j + l_{ij}(p_i - p_j)\text{inv}(\|p_i - p_j\|)]$$

where $$\text{inv}(x) = \begin{cases} 1/x & x \neq 0 \\ 0 & x = 0 \end{cases}$$

It may be observed that performing stress minimization on a small patch is very reliable and far less sensitive to local minima compared with stress minimization at the global level.

Combining using affine transformations: The n sensors are partitioned into n overlapping patches induced by the neighborhood of each of the individual sensors. Localize each patch individually as described in the previous section. Now it is desirable to "stitch" all patches together into one coherent layout.

In an ideal case all patches are localized optimally. Then, they may merge perfectly by utilizing only rigid transformations of the patches, i.e., translations, reflections and rotations. These will ensure that every sensor has the same coordinates in all patches containing it. However, in practice such an ideal case cannot be expected, because of the inaccurate localization of some patches, mostly due to noisy distance measurements. Hence, transformation of each patch is sought so that inconsistencies are minimized in a least squares sense. Moreover, the wider family of affine transformations is utilized that include all rigid transformations with additional operations like scaling and shear. This allows compensating for errors introduced by noise.

Begin with an exemplary definition of an affine transformation.

Given n points in $R^d$, their locations are an n×(d+1) matrix X. The i-th row of X represents the i-th point, where the first d entries are its d coordinates and the last entry is always 1. An affine transformation of the points is a real (d+1)×(d+1) matrix A, and the transformed coordinates are the n×(d+1) matrix XA. Note that homogeneous coordinates are used to facilitate translations.

Consider a patch centered at s. Once this patch has been localized, arrange the local coordinates of its sensors in the $n_s$×(d+1) matrix X(s) where $n_s$=|N(s)|. Thus, each row of X(s) corresponds to one sensor of N(s) and the last column of X(s) contains only 1's. Also denote by P(s) the corresponding $n_s$×(d+1) matrix containing the locations of the same sensors in the global coordinate system. Unlike X(s), the matrix P(s) is unknown.

One wants to relate the local coordinate system with the global one using an affine transformation. This transformation is described by some (d+1)×(d+1) matrix A(s) satisfying X(s)A(s)≈P(s). The best least-squares solution is given by:

$$A(s) = X(s)^+ P(s),$$

where $X(s)^+$ is the pseudo-inverse [9] of X(s). Since X(s) is known, the entries of A(s) are linear expressions of P(s). Now we desire that applying A(s) to X(s) will map it as close as possible to P(s), namely minimize $\|P(s) - X(s)A(s)\|^2$, which is identical to:

$$\min_{P(s)} \|P(s) - (X(s)X(s)^+)P(s)\|^2$$

or, equivalently, find the least-squares solution P(s) to:

$$(I - X(s)X(s)^+)P(s) = 0 \qquad (1)$$

Of course, a trivial solution is when P(s)=0, ways to avoid which are described later.

Now these equations are rephrased using the indices of the sensors in the global system. Recall that the locations of the points in the global coordinate system were defined as $p_1, \ldots, p_n \in R^d$. For each i∈N(s), denote by $[i]_s$ the index of the row in X(s) and P(s) corresponding to i. Hence, the first d entries in the $[i]_s$-th row of P(s) are identical to $p_i$. Consequently, the patch centered at s contributes these $n_s$ equations:

$$p_i - \sum_{j \in N(s)} (X(s)X(s)^+)_{[i]_s,[j]_s} p_j = 0, \quad i \in N(s) \qquad (2)$$

Note that the constant last column of P(s) is omitted from these equations. As long as $n_s$>d+1, it can safely be assumed that it is redundant, since the sum of every row of $X(s)X(s)^+$ is always 1. This can be proven by observing that the last column of X(s) contains only 1's.

Alternatively, it would be legitimate to consider at this point only the coordinates of s. This allows you to reduce the number of equations, so the patch centered at s contributes only a single equation:

$$p_s - \sum_{j \in N(s)} (X(s)X(s)^+)_{[s]_s,[j]_s} p_j = 0$$

or, in other words $$p_s = \sum_{j \in N(s)} w_{[j]_s} p_j \quad s = 1, \ldots, n \qquad (3)$$

for some weights $w_{[j]_s}$ summing to 1.

To summarize, in order to relate all patches together using implicit affine transformations relative to a global layout, a single vector equation for each sensor i (or, alternatively, $n_i$ vector equations) is asseverated. Each such equation expresses its coordinates in the global layout as an affine combination (i.e. linear combination with weights having unit sum) of the coordinates of its neighbors. So overall a system of n (or $\Sigma n_i$) linear homogeneous vector equations in n vector unknowns is obtained. Each equation is constructed internally within the sensor, and no collective distributed effort is required. Later, it is shown how to find the (least squares) solution to this global set of equations. However, the described exemplary embodiment of the system is still underdetermined. Due to all the rows summing to unity, there is at least one degree of freedom corresponding to the translation of the origin. This is eliminated by specifying the position of one sensor. However, this is not sufficient, as the solution can still be degenerate—all sensors will collapse to the position of this anchor (the zero solution to (1), as mentioned above). As shown, in order to avoid another degenerate situation, where all sensors are located within a low-dimensional subspace (e.g., along a line), the position of at least d addition sensors needs to be specified. These are called anchors. Additionally, it should be noted that either system of equations (2) or (3) may be utilized depending on preference and desired characteristics.

Anchoring sensors: As explained in the previous section, the system of equations (3) does not uniquely characterize the global coordinates. In particular, it is possible to completely shrink some of the d axes, resulting in degenerate layouts.

One way around this is to require that the sensor coordinate vectors in the global layout be orthonormal. In this way, it can be shown that the optimal solution to (3) is obtained by solving an n×n lowest eigenvector problem. However, such an eigenvector-based approach is problematic. First, it imposes uniform norms on all axes. This means that the resulting layout always has balanced aspect ratio, which clearly does not always reflect reality. A second issue is that fully distributed computation of eigenvectors is non-trivial. The most significant issue is guaranteeing the orthogonality of the eigenvectors.

A more appropriate way to avoid degenerate layouts, in which some of the axes have collapsed to nothing, is by fixing locations of d+1 affinely-independent anchor sensors. Affine independence means that these sensors do not all lie on any hyperplane of dimension less than d. As explained later, we can know the locations of some sensors. For now, assume the existence of a set $S \subset V$, s.t. the location of each $i \in S$ is known to be $x_i \in R^d$. Consequently, the described system can be augmented with additional |S| equations:

$$p_i = x_i, i \in S \qquad (4)$$

Note that alternatively, these "hard" constraints may be imposed by replacing every unknown $p_i$ with the value $x_i$. However, we found in many experiments that introducing "soft" constraints in the form of additional equations (which are then solved together with (3) by least squares) tends to produce preferred results.

Next the manner of obtaining the coordinates of such anchor sensors is described. First, in many situations some of the sensors in the network are aware of their locations. For example, a few reference sensors might be equipped with a GPS, or the network contains some key sensors that were configured manually. In such a case it would be undesirable to disregard rather than integrate the known locations of these sensors as anchors in our system. This knowledge will also facilitate the elimination of the rigid transformations degrees of freedom that are inherent as long as we have only inter-sensor distance information. This ability to integrate locations of reference sensors is one advantage of the described method over previous anchor-free approaches.

When reference sensors do not explicitly exist, one picks a single set of neighboring sensors, computes their local coordinates, and then adopts this set as the anchor sensors. Certainly, it is desirable to choose a set for which we can compute the coordinates reliably. One exemplary way is to choose the patch that contains the largest number of known pairwise distances. Another alternative, which may be used, is to choose the largest clique, is explained below.

As mentioned before, a layout computation problem becomes trivial when all pairwise distances are known. Hence one s for the largest subset of the sensors for which we know all pairwise distances, namely, the largest clique in the sensor network. In general, finding the largest clique is an NP-hard problem. However, the described network is a disk-graph makes solution easier, since a clique means a subset of the sensors lying within a fixed sized circle. Moreover, one may search only for cliques within a circle centered at a sensor. Therefore each sensor may identify the largest clique around it. Towards this end, the sensor ranks all its neighbors by their measured distance from it, starting with the closest one. Then a clique is grown by trying to add each of the neighbors, where a neighbor is added only if it is connected to all the previously added neighbors. Finally, the largest clique is selected and localized using classical-MDS, thereby fixing the sensors in the clique as anchors.

A distributed solution: At this point, global localization of the sensors is achieved by solving an over-determined system of equations that includes all patch-induced equations (3) and anchor-induced equations (4). Since these are vector equations, solve d independent systems, one for each dimension (axis) of the layout, of the form:

$$Lp^\alpha = b^\alpha, \alpha = 1, \ldots, d \qquad (5)$$

Here, L is an m×n matrix, where m=n+|S|. The unknown vector $p^\alpha$ is the α-th axis of the layout, so the location of i is $p_i = (p_i^1, \ldots, p_i^d)$. The right hand side contains the α-th component of $x_i$ for rows based on equation (3) and zero elsewhere.

The central question is how to solve the linear system (5) in a fully distributed manner. It is well known that the least squares solution of (5) may be computed by solving the n×n normal equations:

$$(L^T L)p^\alpha = L^T b^+, \alpha = 1, \ldots, d$$

Luckily, the sparsity pattern of L facilitates solving these equations using a fully distributed version of a well-known iterative Gauss-Seidel method. As long as the system is overdetermined, this process is guaranteed to converge because $L^T L$ is symmetric positive-definite. An alternative would be to employ another well known method that guarantees convergence in O(n) iterations like the Conjugate-Gradient method.

Global stress minimization: At this stage we have computed a complete layout of the network. However, since the computations were based on the local layouts of the patches, which in turn were based on noisy distances, the result might not be as accurate as possible. While stress minimization is significantly easier on a single patch, there is also an advantage to minimizing the stress of the complete network. The entire network contains many more distances, and this helps to eliminate the influence of noisy measurements, which cancel each other out. Consequently, the exemplary global localization process is completed by performing global stress minimization on the entire network, by the same majorization process described previously. It involves iteratively applying the following update rule at each sensor i:

$$p_i \leftarrow \frac{1}{|\{j \mid \langle i, j \rangle \in E\}|} \sum_{\langle i, j \rangle \in E} [p_j + l_{ij}(p_i - p_j)\mathrm{inv}(\|p_i - p_j\|)]$$

Figure 3:
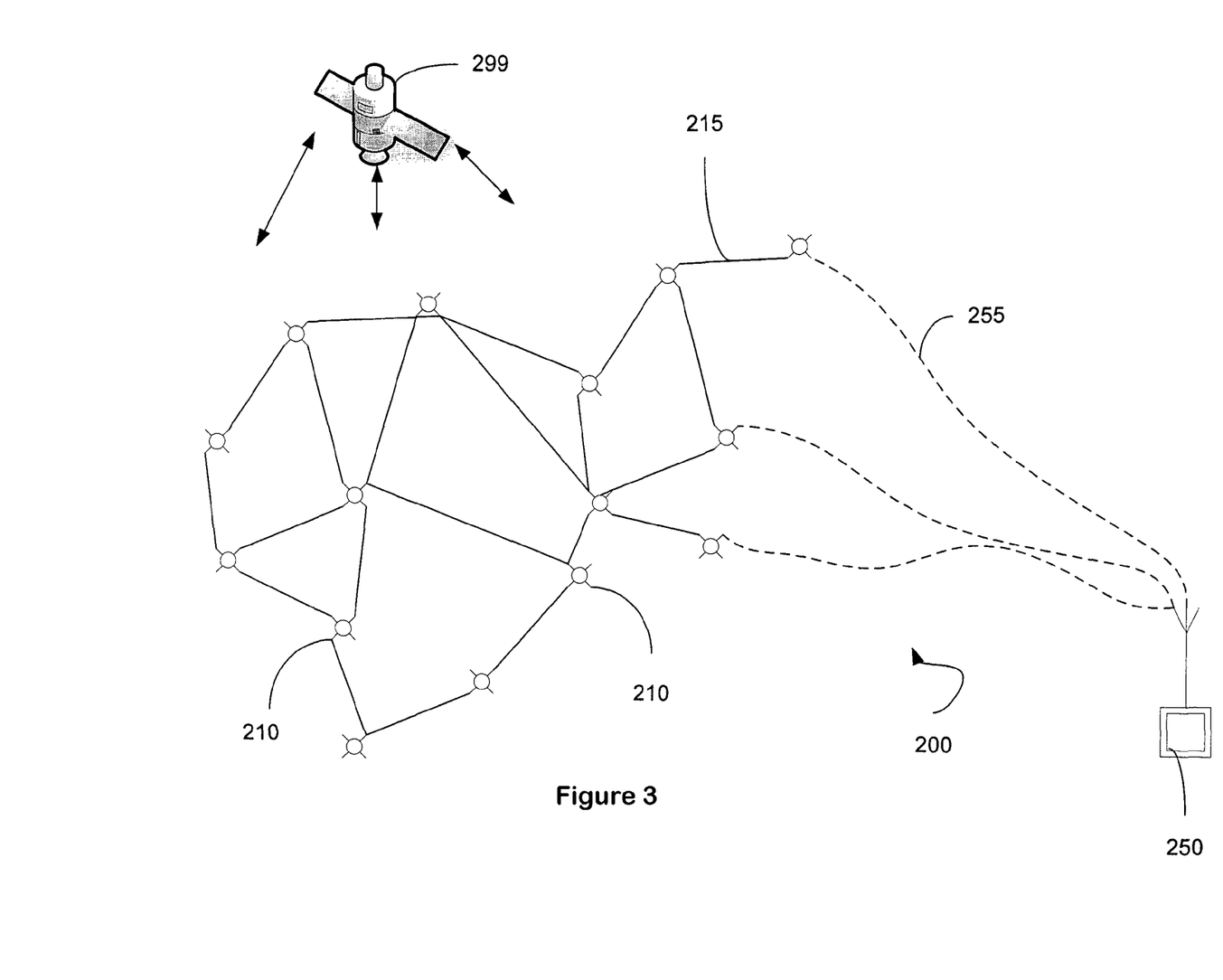
FIG. 3 illustrates a diagram of an exemplary embodiment of a sensor network system utilizing the described method.

FIG. 3 illustrates an exemplary diagram of an embodiment of a sensor network system utilizing the described method. Sensor network 200 is shown in the depicted embodiment as including a control station 250, a plurality of sensor nodes 210 distributed throughout a specified geographic area, and satellite 299. Each of sensor nodes 210 includes one or more sensors, communication means including transmitters and receivers, and memory for storing measurements and other data (all of which are not depicted but known). Sensor nodes 210 are capable of communicating amongst themselves in manners known in the art including radio, wireless communication, phone lines etc. Sensor nodes communication paths 215 are shown in FIG. 3. As mentioned, these could be both wireless or hard-wired communication paths. Additionally, at least a portion of the sensor nodes 210 are capable of communicating with the control station 250 via control communication paths 255.

Additionally, each of the sensor nodes may specifically be configured with GPS equipment (e.g. receivers, transponders etc.) as is known such that the sensor node is aware of its global coordinates or location. As shown, satellite 299 is utilized in the GPS system and allows the GPS system to provide coordinates to the sensor nodes 210 via communication means well known. In the shown system 200, control station 250 may serve as a data collection station for the sensor network, or alternatively the network may include a data collection station communicably connected to the network. Many various embodiments of systems for sensor networks have been contemplated for use with the described method.

Experimental Results: For clarity and explanation purposes, the described PATCHWORK method has been fully implemented in a simulated environment. Sensor networks modeled as disk graphs, containing 200 sensors uniformly distributed in geometric regions of different shapes have been experimented with. The disk radius was varied, which affected the average number of sensor neighbors, and the noise level of the inter-sensor edge length measurements. A random configuration of sensors was generated uniformly within the geometric region, and the lengths $l_{ij}$ of the edges in the disk graph computed. Uniform noise was added to these edge lengths, which then served as input to the localization algorithm. The noise level is controlled by setting the maximal allowed relative deviation. The performance of the localization method was measured in terms of the Average Relative Deviation (ARD) of the resulting layout, defined as:

$$ARD = \frac{2}{n(n-1)} \sum_{i<j} \frac{|d_{ij} - l_{ij}|}{\min(d_{ij}, l_{ij})}$$

which is the average ratio of the deviation of the distance between two sensors in reality ($l_{ij}$) vs. the distances in the layout ($d_{ij}$). Note that this is averaged over all possible sensor pairs, not just sensors adjacent in the network. Thus, the ARD measure takes into account both short-range and long-range errors.

Figure 4:
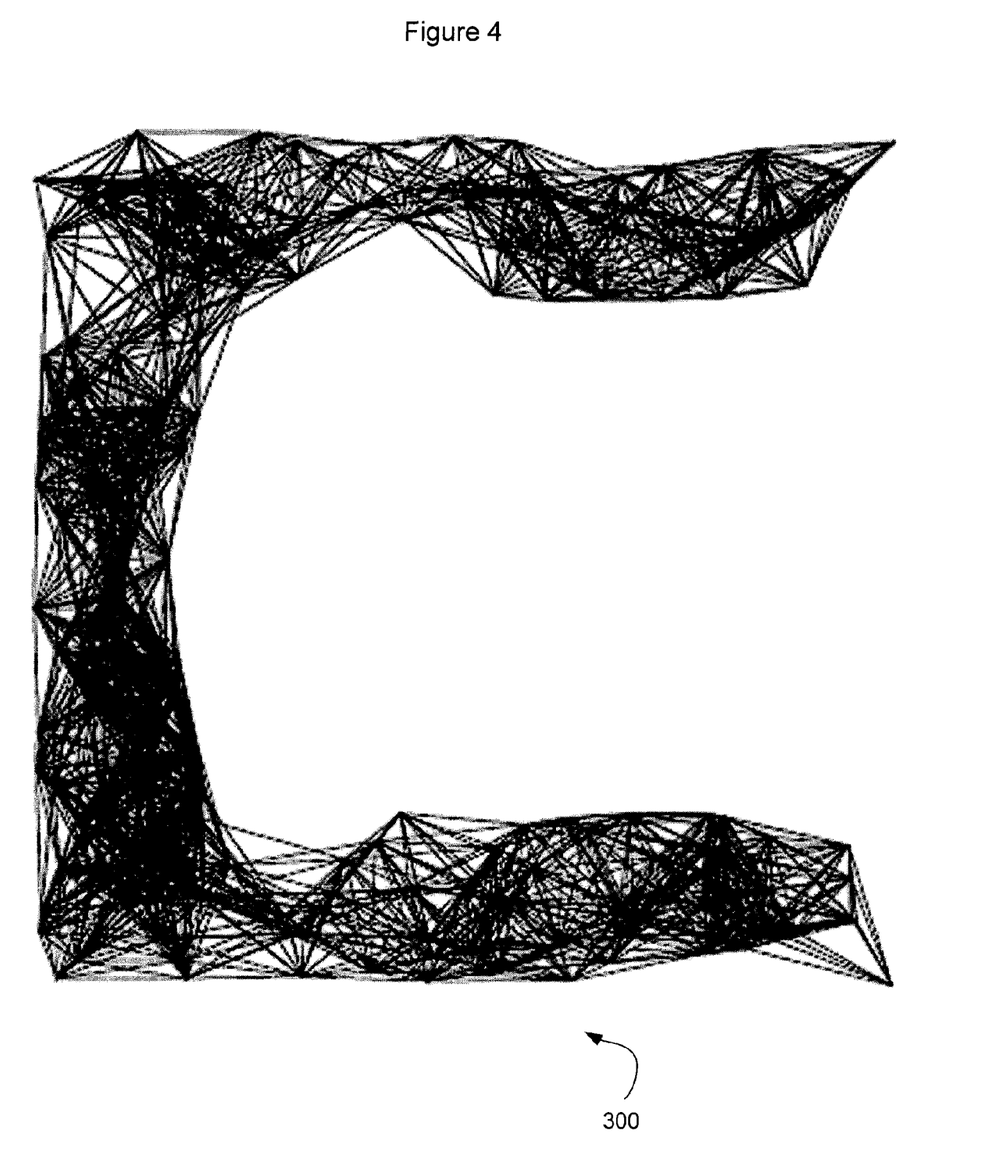
FIG. 4 illustrates a diagram of an exemplary network of sensor nodes.

It seems that localization methods are sensitive to the global nature of the geometric configuration of the sensor network, as well as the local nature. Global nature means the shape of the region in which the sensors are located. Examples of these are square, rectangular, circular and non-convex shapes. Some steps of the method may be particularly sensitive to extreme aspect ratios between the two dimensions of the rectangular region, and certainly to non-convex regions. Hence, three different geometric regions were tested. The first is a 4×4 square, the second a 2×8 rectangle, and the third a non-convex C-shape 300 within a 4×4 square, as illustrated in FIG. 4. In each region, several families of disk graphs were generated characterized by the disk radius and by the noise ratio, as explained above. Then the algorithms were applied to 25 random networks in each family.

Some PATCHWORK illustrative embodiments: In the first exemplary experiment, two illustrative embodiments of the PATCHWORK are described: one based on equation (2), called PW-Full, and the one based on equation (3), called PW-Single for clarity purposes. Moreover, the two manners of choosing anchors, as described previously: one is the anchor-free version, when the algorithm first localizes the largest clique and then uses it as a set of anchor sensors, the other when 6 randomly chosen sensors (that is 3% of the 200 sensors) are given as anchors that are aware of their true positions are compared. Thus there are four different exemplary variants of PATCHWORK described and experimented with. Table 1 shows the results for the 4×4 square. These seem to be representative of all geometries, so for brevity's sake, only the results on the square region are slim. The four exemplary embodiments of the method in each cell of the table in the following manner are visually organized:

| PW-Full, 0 anchors | PW-Full, 6 anchors |
| PW-Single, 0 anchors | PW-Single, 6 anchors |

TABLE 1

| Radius | Error = 1% | | Error = 5% | | Error = 15% | |
| --- | --- | --- | --- | --- | --- | --- |
| 0.7 | 1.44 | 1.67 | 5.35 | 5.47 | 19.3 | 20.4 |
| | 2.06 | 9.57 | 5.68 | 7.54 | 22.2 | 27.2 |
| 0.85 | 0.785 | 1.47 | 4.15 | 4.85 | 17.6 | 17.9 |
| | 0.792 | 0.78 | 4.2 | 4.88 | 17.8 | 18.4 |
| 1 | 0.69 | 0.691 | 3.72 | 3.74 | 17.1 | 17.1 |
| | 0.69 | 0.687 | 3.73 | 3.73 | 17.1 | 17.1 |

Table 1. ARD (×1,000) measured for different variants of PATCHWORK running on 9 different families of networks distributed within a 4×4 square. Each ARD is averaged over 25 random networks. Results are color-coded in gray-scale from worst (black) to best (white).

Next, a few general observations that are true for the four variants should be noted. As expected, performance deteriorates as the noise increases. However, even when the noise causes 15% error in edge length, the average relative deviation of pairwise distances in the resulting layout is much lower than in the input, around 2%. Therefore, to a large extent, errors tend to cancel themselves out. Also, as the radius increases the results are more accurate and there is almost no difference between the four variants. This makes sense, since for the larger radius more information about pairwise distances is known.

It is also evident that PW-Full (top row of each cell) outperforms PW-Single (bottom rows) almost always, but not very significantly. As noted earlier, PW-Full is based on more equations and hence tends to have some quality advantages. When comparing the anchor-free runs (left columns) to the runs where 6 anchors were given (right columns), a small difference with a small consistent advantage to the anchor-free results is desired. How can an anchor-free method outperform an anchored method? The reason is that in the anchor-free case the largest clique as anchors, is selected, and these cliques appear to contain between 15 and 25 sensors.

Thus, the anchor-free method is given an advantage over the case where only 6 anchors are explicitly given. However, note that in the anchor-free case the anchors' coordinates are not accurate but computed by the described system and thus subject to noise. Moreover, the clique is a concentrated set of sensors, while, when given sensor locations from an external source, they are probably better distributed within the region. Hence, as the number of anchors increases, the anchor-based variant will certainly outperform the anchor-free variant by utilizing the extra external information. For larger networks, the largest clique can still be expected to contain just 15-25 sensors, as this is a local property of the network. Thus, if the number of anchors grows as a fraction of the overall network size, it will ultimately exceed the largest clique size and the anchor-free method will be outperformed.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The illustrative methods and systems described herein may be utilized in numerous environments. For example, the described systems and methods may be used in emergency response and related fire, police, and disaster relief systems. Patchwork may be used in the military and defense arena. Additionally, patchwork may be used in telecommunications, travel, shipping, and a broad range of additional business environments. The aforementioned list is merely illustrative and those skilled in the art understand many more uses for the described methods and systems in a wide range of postures and environments not specifically described herein.

While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A method for localization of a sensor network comprising:
    communicating with a plurality of neighboring sensor nodes of a plurality of sensor nodes to determine a patch in the sensor network including determining original distances between a portion of the plurality of neighboring sensor nodes, wherein a location of each of the plurality of sensor nodes in the sensor network is unknown;
    localizing the patch, the localizing comprising:
        estimating missing distances within the patch,
        computing coordinates of the patch using multidimensional scaling, and
        refining a result of the computing using stress minimization based only on the original distances;
    generating a system of equations from the coordinates of the patch to merge the patch with other patches to create a layout of the sensor network, wherein the system of equations comprises:
        patch-induced equations comprising first coordinates of each of the plurality of sensor nodes of the patch expressed in a global layout as an affine combination of second coordinates of the neighboring sensor nodes of each of the plurality of sensor nodes, and
        anchor-induced equations comprising the first coordinates of a set of the plurality of sensor nodes for which the location of each of the set of the plurality of sensor nodes is unknown and is inferred, wherein the location of each of the set of the plurality of sensor nodes is inferred by determining a largest clique in the sensor network and localizing the largest clique using a multidimensional scaling technique so as to adopt the set of the plurality of sensor nodes in the clique as anchors; and
    solving the system of equations using a distributed equation solver to compute the layout of the sensor network including global coordinates of each of the plurality of sensor nodes in the sensor network.

2. The method for localization of the sensor network of claim 1, further comprising performing a global stress minimization.

3. The method for localization of the sensor network of claim 1, wherein localizing the patch further comprises estimating a pairwise distance between the plurality of sensor nodes.

4. The method for localization of the sensor network of claim 1, the system of equations being linear equations.

5. The method for localization of the sensor network of claim 1, wherein generating the system of equations is performed at each of the plurality of sensor nodes in the network.

6. The method for localization of the sensor network of claim 1, wherein each of the plurality of sensor nodes includes a sensor, a transmitter, and a receiver.

7. A plurality of sensor nodes communicably linked in a sensor network, each of the sensor nodes being configured to:
    communicate with a plurality of directly neighboring sensor nodes of the plurality of sensor nodes to determine a patch in the sensor network including determining original distances between a portion of the plurality of directly neighboring sensor nodes, wherein a location of each of the plurality of sensor nodes in the sensor network is unknown;
    localize the patch by estimating missing distances within the patch, computing coordinates of the patch using multidimensional scaling, and refining a result of the computing using stress minimization based only on the original distances;
    generate a system of equations from the coordinates of the patch to merge the patch with other patches to create a layout of the sensor network, wherein the system of equations comprises:
        patch-induced equations comprising first coordinates of each of the plurality of sensor nodes expressed in a global layout as an affine combination of second coordinates of the directly neighboring sensor nodes of each of the plurality of sensor nodes, and
        anchor-induced equations comprising the first coordinates of a set of the plurality of sensor nodes for which the location of each of the set of the plurality of sensor nodes is unknown and is inferred, wherein the location of each of the set of the plurality of sensor nodes is inferred by determining a largest clique in the sensor network and localizing the largest clique using a multidimensional scaling technique so as to adopt the set of the plurality of sensor nodes in the clique as anchors; and solve the system of equations using a distributed equation solver to compute the layout of the sensor network including global coordinates of each of the plurality of sensor nodes in the sensor network.

8. The plurality of sensor nodes of claim 7, each of the plurality of sensor nodes further configured to perform a global stress minimization.

9. The plurality of sensor nodes of claim 7, each of the plurality of sensor nodes including a sensor.

10. A non-transitory computer readable medium, the computer readable medium containing instruction stored thereon for execution by a computer the instructions including:

communicating with a plurality of directly neighboring sensor nodes of a plurality of sensor nodes to determine a patch in a sensor network including determining original distances between a portion of the plurality of directly neighboring sensor nodes, wherein a location of each of the plurality of sensor nodes in the sensor network is unknown;

localizing the patch, the localizing comprising:
 estimating missing distances within the patch,
 computing coordinates of the patch using multidimensional scaling, and
 refining a result of the computing using stress minimization based only on the original distances;

generating a system of equations from the coordinates of the patch to merge the patch with other patches to create a layout of the sensor network, wherein the system of equations comprises:

patch-induced equations comprising first coordinates of each of the plurality of sensor nodes expressed in a global layout as an affine combination of second coordinates of the directly neighboring sensor nodes of each of the plurality of sensor nodes, and anchor-induced equations comprising the first coordinates of a set of the plurality of sensor nodes for which the location of each of the set of the plurality of sensor nodes is unknown and is inferred, wherein the location of each of the set of the plurality of sensor nodes is inferred by determining a largest clique in the sensor network and localizing the largest clique using a multidimensional scaling technique so as to adopt the set of the plurality of sensors in the clique as anchors; and solving the system of equations using a distributed equation solver to compute the layout of the sensor network including global coordinates of each of the plurality of sensor nodes in the sensor network.

11. The computer readable medium of claim 10, the instructions further including performing a global stress minimization.

* * * * *